Figure 2:
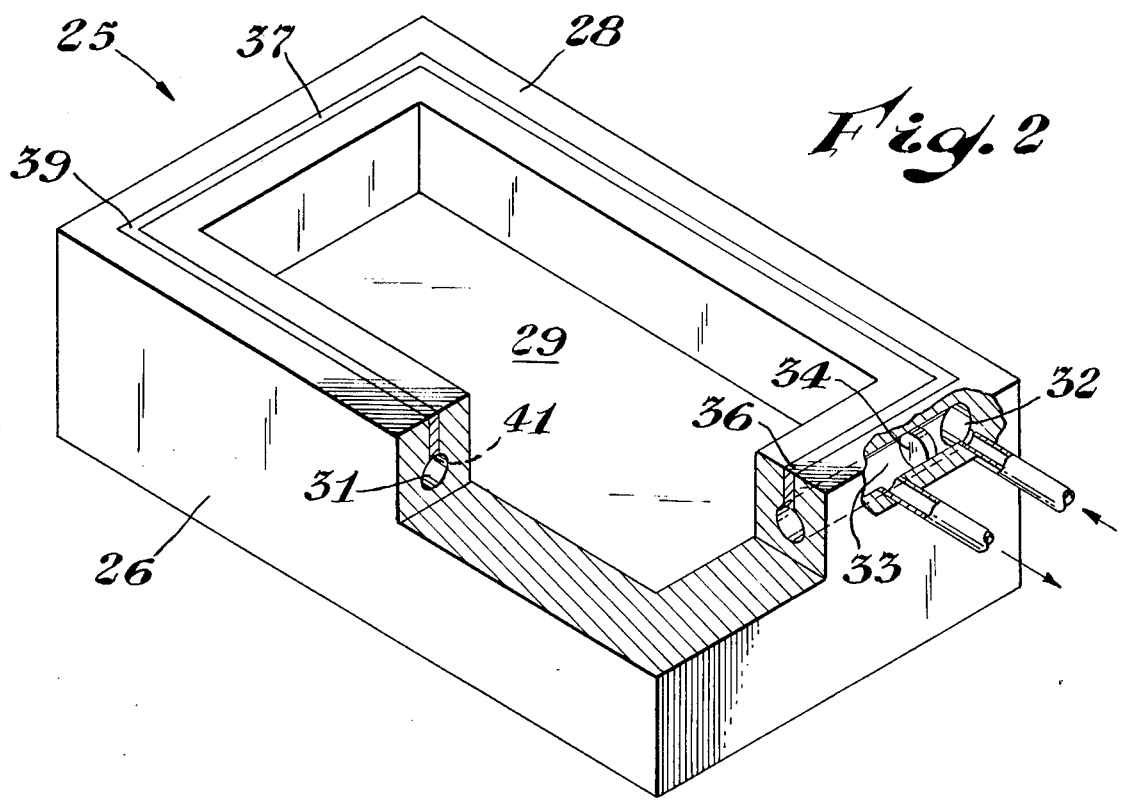

United States Patent [19]

Hay, II

[11] 4,062,718
[45] Dec. 13, 1977

[54] HEAT SEALING MEANS

[75] Inventor: Robert A. Hay, II, Midland, Mich.

[73] Assignee: The Dow Chemical Company, Midland, Mich.

[21] Appl. No.: 720,018

[22] Filed: Sept. 2, 1976

[51] Int. Cl.$^2$ .............. B30B 15/34; B65B 7/28; B65B 51/32

[52] U.S. Cl. .............. 156/498; 53/373; 93/DIG. 1; 156/583

[58] Field of Search .............. 156/583, 311, 498, 515, 156/580; 93/33 H, DIG. 1; 53/39, 204, 373; 100/93 P

[56] References Cited

U.S. PATENT DOCUMENTS

| | | | |
|---|---|---|---|
| 2,004,041 | 6/1935 | Driver | 93/33 H |
| 2,153,351 | 4/1939 | Steinberger | 156/515 |
| 2,252,779 | 8/1941 | Moore | 53/39 |
| 2,621,704 | 12/1952 | Langer | 156/498 |
| 2,665,737 | 1/1954 | Hasselquist | 156/583 |
| 2,796,913 | 6/1957 | Fener et al. | 156/515 |
| 3,160,999 | 12/1964 | Lee | 53/39 |
| 3,496,049 | 2/1970 | Anderson | 156/311 |
| 3,692,613 | 9/1972 | Pederson | 156/498 |

Primary Examiner—Charles E. Van Horn
Assistant Examiner—M. G. Wityshyn
Attorney, Agent, or Firm—R. B. Ingraham

[57] ABSTRACT

Efficient heat sealing, particularly of thicker and/or heat shrinkable plastic materials, is obtained using a fluid heated and cooled heat-sealing member having a body of a material of low thermal conductivity and a strip of material of high thermal conductivity communicating with a heat exchange fluid passage therein.

8 Claims, 3 Drawing Figures

U.S. Patent     Dec. 13, 1977     4,062,718

HEAT SEALING MEANS

Heat sealing of plastic sheets and films has been accomplished in a variety of manners ranging from an electrically heated incandescent wire passed through two thin plastic films to be joined to polytetrafluoroethylene-faced electrically heated bars which are pressed over film or sheet to be joined. In other forms of heat sealing, two or more layers of plastic film are clamped in a suitable jig or fixture and hot gas applied to exposed portions of the film to obtain the desired fusion therebetween. Generally in most operations such as sealing it is desirable to obtain as rapid sealing cycle as possible. In one form of heat sealer, a small tube is used as the sealing element, the tube is heated by a fluid passing therethrough and is subsequently cooled by passing a cooling fluid therethrough. Oftentimes in the heat sealing of heavier plastic films such as those having thicknesses of two and one-half to three mils or more, at least part of the sealing cycle is required to heat the films to be joined to a sealing temperature and to cool the films below their thermoplastic temperature wherein the resultant article or package can be handled without damage thereto. Many thermoplastic materials are heat-sensitive, that is, tend to decompose and/or shrink when their temperature is raised above a predetermined level. Thus, for at least some plastics and particularly in thicker films, it is often undesirable to employ an incandescent wire as scorching and/or undesired shrinking of the material often occurs. Generally in order to obtain a seal of maximum strength and good appearance, such heat sealing is done in a mold which, in effect, supports the article or package being heat sealed while material in a predetermined region is pressed together and restrained from moving while being raised to heat-sealing temperature and cooled to a temperature at which it is self-supporting. Molds or heat-sealing devices of this nature frequently show a substantial thermal lag. If the heat-sealing element, for example, is electrically heated and both thermally and electrically insulated, heating is rapidly and efficiently accomplished while cooling of the sealed region is substantially impaired by the presence of the thermal insulation.

It would be desirable if there were available an improved device for the heat sealing of thermoplastics which could be rapidly heated and rapidly cooled.

It would also be desirable if there were available a heat-sealing device for plastic film and sheet in which the temperature of the heat-sealing surface could be maintained at a generally uniform temperature without hazard of local overheating and capable of rapid cooling.

It would also be desirable if there were available a heat-sealing device which could be rapidly heated, cooled and be of rugged simple construction.

All thermal conductivity values stated herein have the units of British thermal units per hour square foot per degree Fahrenheit per foot at 212° F.

These features and other advantages in accordance with the present invention are achieved in a heat-sealing element, the heat-sealing element comprising a body having a heat-sealing face adapted to be disposed adjacent a film or sheet body to be sealed, the body having a thermal conductivity of less than about 30 and preferably less than 20, the body defining a heat exchange fluid passageway, the heat exchange fluid passageway having an inlet and an outlet to permit flow of heat exchange fluid through the passageway, an elongate slot communicating with the heat exchange fluid passageway and the sealing face of the body, the slot being located in a region wherein it is intended that the sealing face should cause a seal on a workpiece, a heat-sealing member of a metal having a thermal conductivity of at least 175, the heat-sealing member being in liquid-tight sealing engagement with the body, the metal of high thermoconductivity being in said slot, the metal of high thermal conductivity having a sealing face generally commensurate with the adjacent portion of the sealing face of the body a fluid-contacting face generally parallel to and remote from the sealing face and in communication with the heat-exchange passage.

Figures 1, 3:
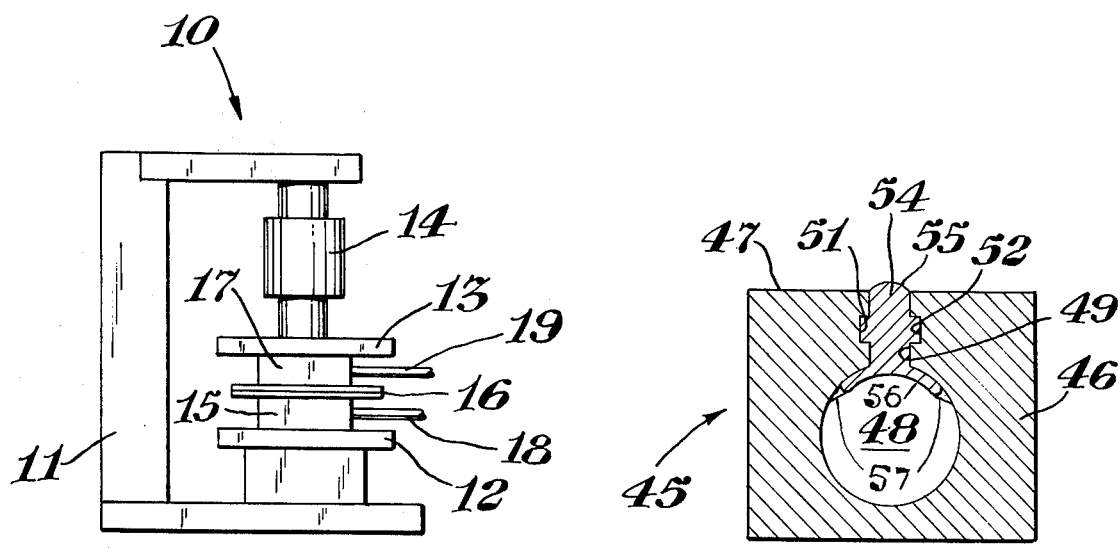

Further features and advantages of the present invention will become more apparent from the following specification taken in connection with the drawing wherein:

FIG. 1 is a schematic representation of one embodiment of a heat-sealing apparatus useable in the present invention;

FIG. 2 schematically depicts a partially cut-away view of a heat-sealing element in accordance with the present invention; and FIG. 3 is a sectional view of an alternate embodiment of the invention.

In FIG. 1, there is depicted a heat-sealing apparatus generally designated by the reference numeral 10. The apparatus 10 comprises in cooperative combination a frame 11. Disposed on the frame 11 is a lower or fixed platen 12 and an upper or movable platen 13 supported on linear actuator 14 which causes the platens 12 and 13 to move apart relative to one another. A first heat-sealing mold element 15 is supported on the platen 12. A thermoplastic sheet article 16 is disposed within the mold element 15 and a second heat-sealing mold element 17 is disposed immediately above the article 16 and the first heat-sealing element 15. Heat exchange fluid supply and take-away lines 18 and 19 are in operative combination with the heat-sealing elements 15 and 17, respectively. In operation of the apparatus of FIG. 1, the thermoplastic film articles to be joined together are placed within first heat-sealing element 15. The element 17 is then positioned by the platen 13 and actuator 14 in the desired mating relationship. Heat exchange fluid is then supplied to one or both of the heat-sealing elements 15 and 17 until the plastic film has reached desired sealing temperature. A cooling heat exchange fluid is then provided to the lines 18 and 19 to cool sealed portions of the package to self-supporting temperature, the platen 17 retracted, and the article removed. Beneficially desirable heat-transfer media are steam and water which are quite satisfactory for the joining of many plastic materials. In some instances where low pressures are desired, heated glycerin may be employed with the attendant recovery problems.

In FIG. 2 there is depicted a heat-sealing support element in accordance with the present invention generally designated by the reference numeral 25. The heat-sealing element 25 comprises a body 26 having a heat-sealing and product-supported face 28. The face 28 defines a product-receiving cavity 29 generally centrally disposed therein. Within the body 26 is formed a heat-exchange fluid passageway 31. The passageway 31 has a first end 32 and a second end 33. The ends 32 and 33 are adjacent one another and the passageway 31 extends about a peripheral portion of the body 26 adjacent the surface 28. The direction of flow within the passageway 31 is not critical and arbitrarily the first end 32 is designated as the inlet end and the second end 33 as the outlet end. A plug 34 separates the inlet end 32 and the outlet end 33. The conduit or passageway 31, in effect, describes a loop about the periphery of the product-receiving cavity 29. The body 26 is constructed of a material having a low thermal conductivity (below 30) such as carbon steel, stainless steel, or the like. Particularly desirable materials of construction are any of the well-known so-called stainless steel alloys. A slot 36 is defined by the body 26. The slot extends in a peripheral manner about the product-receiving cavity 29 and provides full communication between the passageway 31 and the sealing face 28. Within the slot 36 is disposed the heat-sealing member 37. The heat-sealing member 37 has a heat-sealing face 39 which is generally coplanar with the face 28 but raised slightly above the face 28. The heat-sealing member 37 has an oppositely disposed face 41 which terminates at a location generally adjacent the passageway 31. Beneficially the heat-sealing member 37 is of a metal having high thermal conductivity (greater than 175) such as copper, silver or gold. For most applications, silver is very satisfactory. Usually it is preferred to use fine silver rather than sterling silver because of the ductility. On the application of the heat-exchange fluid such as steam to the inlet of the sealing element 25, the surface 39 of the sealing member 37 heats rapidly whereas the adjacent portions of the surface 28 change temperature very slowly. When the flow of steam is discontinued cooling water quickly reduces the temperature of the surface 39 of the sealing member 37 while the adjacent portion of the body 26 changes in temperature relatively little.

In FIG. 3 there is schematically depicted a sectional view of an elongate linear sealing bar generally designated by the reference numeral 45. The bar 45 has a body 46, a sealing face 47, a heat exchange fluid passageway 48. A groove or slot 49 extends between the sealing face 47 and the fluid passageway 48. The groove 49 is generally normally disposed to the surface 47. Within the groove 49 are defined first and second longitudinal grooves 51 and 52 extending the entire length of the slot 49. The body 46 is formed of a material of generally low thermal conductivity. A sealing member 54 fills the slot 49 and grooves 51 and 52. The sealing member 54 has a sealing face 55 and is raised slightly above the sealing face 47 of the body 46. Oppositely disposed to the face 55 of the sealing member 54 is heat exchange fluid engaging face 56. A layer of sealant 57 is disposed within the passage 48 on the body 46. The preparation of heat-sealing elements in accordance with the present invention will vary generally as does the type of sealing element desired.

In the preparation of an element such as depicted in FIG. 2, it is usually desirable to first form the product-supporting cavity 29 and the slot 36. The slot 36 is then filled with an appropriate amount of silver and the silver oven-brazed into the slot under an inert atmosphere. The heat exchange passage is then drilled and appropriate plugs employed as necessary and desired. Conduits in communication with passageway 31 can be threadably connected or brazed at the time the silver or other highly conductive metal is brazed in the slot 36. The face 28 may be coplanar with the surface 39 or may be cut to lie below the surface 39 of the sealing member 37 depending upon the particular requirements of the ultimate package to be sealed or article to be formed. Heat sealing elements such as the element 45 can readily be formed by drilling the passage 48, milling the slot 49 with either an end mill or using a horizontal mill. A bar is then placed within the passageway 48 and a strip of metal having high thermal conductivity placed within the slot 49 and peened to fill or substantially fill the grooves 51 and 52. For purposes of illustration, the grooves 51 and 52 have been shown much larger than is necessary for retention of the metal strip. A sealant such as a silicone rubber sealant may then be introduced through passage 48 to assure a liquid-tight joint between the sealing element 54 and the body 46. The face 56 may then be ground or broached to remove any contaminating sealant.

Sealing elements in accordance with the present invention are satisfactory for the heat-sealing of a wide variety of plastic films and they are sufficiently strong to withstand superatmospheric pressure or steam at superatmospheric pressures.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A heat-sealing element, the heat-sealing element comprising a body having a heat-sealing face adapted to be disposed adjacent a film or sheet to be sealed, the body having a thermal conductivity of less than about 30, the body defining a heat-exchange fluid passageway, the heat-exchange fluid passageway having an inlet and an outlet to permit flow of heat-exchange fluid through the passageway, an elongate slot communicating with the heat-exchange fluid passageway and the sealing face of the body, the slot being located in a region wherein it is intended that the sealing face should cause a seal on a workpiece, a heat-sealing member of a metal having a thermal conductivity of at least 175, the heat-sealing member being in liquid-tight sealing engagement with the body, the heat-sealing member being in said slot, the heat-sealing member having a sealing face generally commensurate with the adjacent portion of the sealing face of the body, the heat-sealing member having a fluid-contacting face generally parallel to and remote from the sealing face and in communication with the heat-exchange passage.

2. The heat-sealing element of claim 1 wherein the thermal conductivity of the body is less than 20.

3. The heat-sealing element of claim 1 wherein the body is of stainless steel.

4. The heat-sealing element of claim 1 wherein the heat-sealing member is silver.

5. The heat-sealing element of claim 1 having the general form of an elongate bar.

6. The heat-sealing member of claim 1 wherein the heat-sealing face has defined therein an article receiving cavity at least partially surrounded by the heat-sealing member.

7. The heat-sealing element of claim 1 in operative combination with heat-sealing apparatus and heating and cooling supply means.

8. A heat-sealing element comprising a stainless steel body having a heat-sealing face adapted to be disposed adjacent a film or sheet to be sealed, the body having a thermal conductivity of less than about 20, the body defining a heat-exchange fluid passageway, the heat-exchange fluid passageway having an inlet and an outlet to permit flow of heat-exchange fluid through the passageway, an elongate slot communicating with the heat-exchange fluid passageway and the sealing face of the body, the slot being located in a region wherein it is intended that the sealing face should cause a seal on a workpiece, a silver heat-sealing member, the heat-sealing member being in liquid-tight sealing engagement with the body, the heat-sealing member being in said slot, the heat-sealing member having a sealing face generally commensurate with the adjacent portion of the sealing face of the body, the heat-sealing member having a fluid-contacting face generally parallel to and remote from the sealing face and in communication with the heat-exchange passage.

* * * * *